(12) United States Patent
Wang et al.

(10) Patent No.: US 10,362,082 B2
(45) Date of Patent: Jul. 23, 2019

(54) METHOD FOR STREAMING-BASED DISTRIBUTED MEDIA DATA PROCESSING

(71) Applicant: Baidu USA LLC, Sunnyvale, CA (US)

(72) Inventors: Quan Wang, San Jose, CA (US);
Haojun Wang, San Jose, CA (US);
Shaoshan Liu, Fremont, CA (US);
James Peng, Fremont, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 121 days.

(21) Appl. No.: 15/096,911

(22) Filed: Apr. 12, 2016

(65) Prior Publication Data

US 2017/0295214 A1    Oct. 12, 2017

(51) Int. Cl.
*H04L 29/06*    (2006.01)

(52) U.S. Cl.
CPC .......... *H04L 65/601* (2013.01); *H04L 65/607* (2013.01)

(58) Field of Classification Search
CPC ............................ H04L 65/601; H04L 65/607
USPC .................................................. 709/219, 203
See application file for complete search history.

(56) References Cited

U.S. PATENT DOCUMENTS

| | | | | |
|---|---|---|---|---|
| 2004/0267940 A1* | 12/2004 | Dideriksen | ......... | G06F 9/44526 709/228 |
| 2008/0235624 A1* | 9/2008 | Murata | ................. | G06F 3/0482 715/825 |
| 2009/0144758 A1* | 6/2009 | Murakawa | .............. | G06F 9/451 719/328 |
| 2009/0150458 A1* | 6/2009 | Igarashi | ................ | G06F 16/258 |
| 2014/0115608 A1* | 4/2014 | Shirasaka | ............. | G06F 9/4411 719/321 |
| 2014/0118541 A1* | 5/2014 | Lasko | .................... | H04N 7/181 348/143 |
| 2014/0211244 A1* | 7/2014 | Murakami | .......... | G06F 9/44526 358/1.15 |
| 2015/0255076 A1* | 9/2015 | Fejzo | .................... | G10L 19/008 704/500 |

* cited by examiner

*Primary Examiner* — Duyen M Doan
(74) *Attorney, Agent, or Firm* — Womble Bond Dickinson (US) LLP (57) ABSTRACT

In one embodiment, a cluster manager partitions media data into multiple media data partitions, each of which is to be processed by a computing node of a computing system. A platform module in a computing node receives a number of media files included in a media data partition. The platform module encodes each media file from an original format into a predefined format. The platform module then combines or serializes each encoded media file into a single stream of serialized data, and transmits it to a user module in the computing node. The user module separates from each other the received encoded media files. The user module then decodes each separated, encoded media file from the predefined format into the original format, and performs a specific media processing operation on each decoded file. Examples of the media processing operation include classification, image transformation, and feature extraction.

27 Claims, 9 Drawing Sheets

METHOD FOR STREAMING-BASED DISTRIBUTED MEDIA DATA PROCESSING

FIELD OF THE INVENTION

Embodiments of the present invention relate generally to data processing. More particularly, embodiments of the invention relate to streaming-based processing of media data on a distributed computer system.

BACKGROUND

The growing use of smartphones and other hand-held computing devices, equipped with high-resolution cameras and large-view touchscreens, has significantly increased multimedia contents on the Internet. This increase includes the amount of multimedia content available to users nowadays, as well as the amount of multimedia data consumed or produced (e.g., searched for, viewed, streamed, or uploaded) by them and transmitted over the Internet. The wide availability of complimentary or low-cost wireless Internet access (Wi-Fi) and increased use of more affordable mobile data plans also contribute to such increase.

This presents several challenges for traditional distributed data processing systems to process the multimedia contents. First, most existing systems and algorithms are not specifically designed or optimized to process photos, audio, or video contents. For example, unlike indexing a textual webpage where its keywords are typically available within that webpage, the task of "understanding" and indexing a photo with no additional description is much more difficult, often requiring complex machine learning and/or image analysis algorithms. Moreover, running those algorithms can be much more demanding on computation resources. Secondly, a multimedia content file can be larger than a textual counterpart by many orders of magnitude. For example, a novel in a textual format can be well within hundreds of kilobytes (KBs), whereas a High-Definition movie based on that novel can easily take several gigabytes (GBs), depending on the movie file resolution and its compression method and/or level. This difference can necessitate re-designing existing systems to process the multimedia contents efficiently. Also, to allow different applications to work on the same distributed processing system without significant or frequent changes to the system, it is desirable to provide applications with some flexibility to use such a system.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the invention overcome the limitations of the prior art by partitioning media data into multiple partitions and processing each partition on individual computing nodes of a large computing system, preferably in a streaming-based manner.

In one embodiment, to provide users with flexibility using the system, the processing of each media data partition by computing nodes is performed by a platform module and one or more user modules of a computing node. As a result, a user module may perform specific media operations independently of the platform module and other user modules' operations. This allows modifying the user module or deploying a new user module without affecting the platform module or other user modules. Accordingly, some common format may be required between the platform module and the user module to transmit and receive media data.

In one embodiment, a cluster manager of a computing system partitions media data into multiple media data partitions, each of which is to be processed by a computing node of the computing system. Each of the partitions includes media files storing one or more particular types of media data. Each computing node may be configured to perform a particular media processing operation. A platform module in a computing node receives a number of media files included in a media data partition. The media files are in either an original format or certain archived format containing the original format, while different types of media files may have different formats. The platform module encodes each media file from the original format into a predefined format. The platform module then combines or serializes each encoded media file into a single stream of serialized data, and transmits it to a user module in the computing node. The user module separates from each other the encoded media files in the received single stream of serialized data. The user module then decodes each separated, encoded media file from the predefined format into the original format, and performs a specific media processing operation on each decoded file. Examples of the media processing operation include classification, image transformation, and feature extraction.

After the media processing operation, the user module may process the media files similarly as the platform module does previously and transmit them back to the platform module. Specifically, the user module may encode each media file from the original format into the predefined format and combines each file into another single stream of serialized data before transmitting to the platform module.

Figure 1:
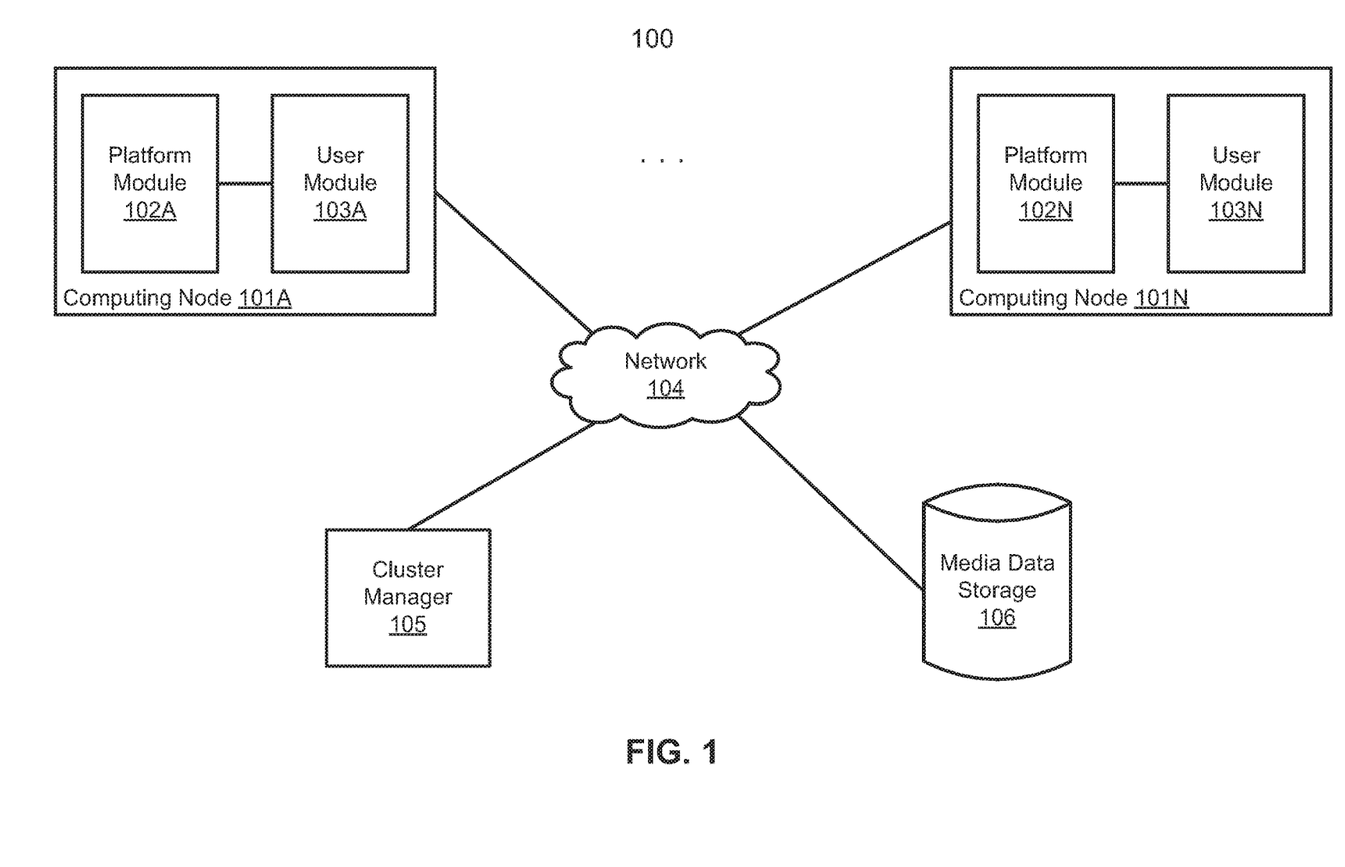
FIG. 1 is a block diagram illustrating a computing system for media data processing according to one embodiment of the invention.

FIG. 1 is a block diagram illustrating a computing system for media data processing according to one embodiment of the invention. Referring to FIG. 1, computing system 100 includes, but not limited to, one or more computing nodes 101A, ..., 101N coupled to cluster manager 105 and media data storage 106 over network 104. Computing system 100 is a distributed computer system capable of executing large-scale computation and/or data processing applications in parallel by potentially a large number of computing nodes, typically connected by a high-speed interconnection network.

Each computing node (e.g., 101A, 101B (not shown), ..., and 101N) includes a platform module and a user module, which will be described in more details with respect to FIGS. 2A-2D and 3. A platform module acts between the distributed computing system and users, providing shared services to support multiple user programs or modules and the flexibility for them to use the computing system. As a result, when one of the user programs or modules needs to be changed or removed, the platform module and other user programs or modules may not be affected. The platform modules of different computing nodes may be substantially the same or similar when deployed, although they may work on different data sets or execute different processing tasks. A computing node may have one or more user modules. A user module represents a specific user program running on a computing node and interacting with the platform module thereon. The computing nodes are connected via network 104, which may be a high-speed interconnection network.

Cluster manager 105 manages the overall application execution on computing system 100, by converting the whole application into a number of jobs and scheduling each of those jobs onto one of the computing nodes of computing system 100, for example, to implement load balancing. Cluster manager 105 may also manage resource sharing and scheduling among multiple applications running concurrently on the computing nodes. Alternatively, one of the computing nodes may perform cluster manager 105's functions.

In one embodiment, media data is stored in media data storage 106 and to be processed by computing system 100. Cluster manager 105 may partition the media data into N partitions, and schedules each partition onto one of the computing nodes for processing. Each media data partition includes one or more media files to be processed by a computing node. Each media file can be stored in its original format in media data storage 106. The original formats of different media files may be different. Media data storage 106 may be a special-purpose server computer connected to a storage network, serving as a storage server for computing system 100. Media data storage 106 may also be on a cloud-based storage service provider serving a large number of cloud users. Alternative to connecting to network 104, media data storage may be directly attached to one or more computing nodes, or to cluster manager 105.

In one embodiment, due to the very large number of media files to be processed, the media files stored on media data storage 106 are packed into a smaller number of archives, each of which typically includes dozen, hundreds, or sometimes even thousands of the media files. This archiving is advantageous in such embodiments since, among others, the number of files needed to be transmitted over the network will be decreased, thereby reducing the overheads that may be incurred during the transmission. The rate of error and needs for re-transmission may also be reduced. Archiving is also helpful to overcome certain limitations of distributed storage systems, such as media data storage 106. Therefore, as one of ordinary skills in the art understands, the overall processing performance of computing system 100 may be increased by archiving media files before transmission. Media data stored in media data storage 106 may be utilized by a search engine to search and return contents to a client in response to a search query over a network (e.g., the Internet).

Figure 2A:
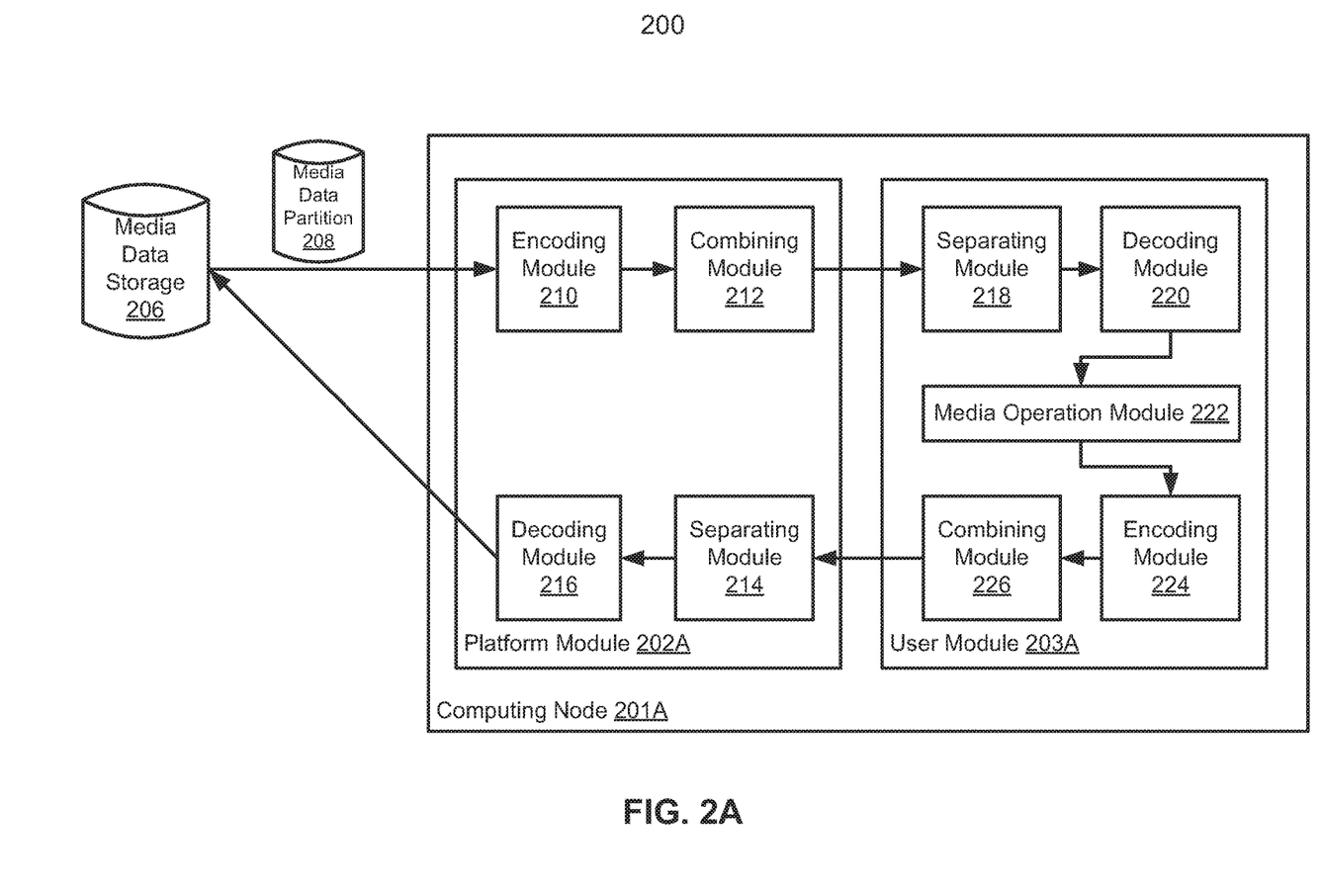
FIGS. 2A-2D are block diagrams illustrating various embodiments of a computing node according to certain embodiments of the invention.

FIGS. 2A-2D are block diagrams illustrating various embodiments of a computing node according to certain embodiments of the invention. Referring to FIG. 2A, computing node 201A includes platform module 202A and user module 203A. Media data partition 208 is the media data partition scheduled by cluster manager 105 to be processed at computing node 201A, which is transmitted from media data storage 206 to computing node 201A and first processed by platform module 202A.

Platform module 202A processes media data partition 208 received from media data storage 206 into a single stream of serialized data, a format supported by both platform module 202A and user module 203A, and transmits the same to user module 203A. As one of ordinary skills in the art understands, this streaming-based approach avoids otherwise possible needs for computing node 201A to load and store a large amount of media data in its memory during runtime when platform module 202A is processing the media data, thereby keeping the memory consumption by platform module 202A substantially constant regardless of the file size of media data being processed by platform module 202A. This may be particularly advantageous for certain applications, such as feature analysis and classification applications of media data. In such applications, since media file sizes are larger, loading a large number of media files at a time can be challenging in various aspects and present several issues, e.g., the increased burden for dynamical memory allocation (from the system's perspective) or manual memory management (from the developer's perspective when programming in C or similar languages), as well as performance issues related to garbage collection mechanism used by Java or C# implementations.

In the embodiment shown in FIG. 2A, platform module 202A includes encoding module 210, combining module 212, separating module 214, and decoding module 216. As shown in FIG. 2A, media data partition 208 transmitted from media data storage 206 is one of the N media data partitions partitioned by cluster manager 105 and scheduled onto computing node 201A for processing. After receiving media data partition 208, encoding module 210 encodes each of the media files in media data partition 208 from its original format into a predefined format. The predefined format and the encoding mechanism are usually agreed upon and/or supported by both the platform module and the user module. The media files of various types may be in a variety of original formats. For example, for image files, the original formats may include, but not limited to, JPEG (Joint Photographic Experts Group), bitmap, PNG (Portable Network Graphics), GIF (Graphics Interchange Format), TIFF (Tagged Image File Format), etc. For audio files, the original formats may include, but not limited to, WAV, MP3, MPC, WMA, AAC, M4A, FLAC, etc. For video files, the original formats may include, but not limited to, Matroska, FLV, WMV, RMVB, MPEG, etc.

In one embodiment, the encoding of a given image file from an original format into a predefined format works as follows. In this example, assume that the given image file is a JPEG file, the file name is "SampleImageFileName1.JPEG," and the file size is 150,000 bytes. The image stored in the file content is in accordance with a JPEG specification. The encoding process first adds information about the image file to the beginning of the image file. Such information includes an integer-type field indicating the number of characters of the file name (which is 25 for this example, the number of characters in "SampleImageFileName1.JPEG"), an array of characters storing the file name ("SampleImageFileName1.JPEG" in this example), and an integer indicating the file size in bytes (which is 150,000). The integer indicating the number of characters of the file name is usually 4 bytes. Other number of bytes may be practically chosen as well. The integer indicating the number of characters in the file name and the array of characters storing the file name enable the user module to correctly restore the file name from an encoded media file. The integer indicating the file size enables the user module to identify the correct end location of the media file and to separate one media file from another. The integer indicating the file size is usually 4 bytes or 8 bytes, depending on the possible maximal file size of the media files to be processed. Other number of bytes may be practically chosen as well. The content of the file, SampleImageFileName1.JPEG, follows the integer indicating the file size.

After the above information is added to the front of the image file, the encoding process converts the array of characters storing the file name into a corresponding array of bytes, with each byte storing the value of the ASCII code of the corresponding character in the file name. The encoding process may preserve, without changes to, the integer indicating the number of characters of the file name and the integer indicating the file size, as well as the content of the media file. In the above example, the array of integers storing the corresponding value of the ASCII codes of the file name, SampleImageFileName1.JPEG, is as follows (in decimal): 083, 097, 109, 112, 108, 101, 073, 109, 097, 103, 101, 070, 105, 108, 101, 078, 097, 109, 101, 049, 046, 074, 080, 069, 071. It is noted that the encoding approach is not limit to ASCII-code only, as one of ordinary skills in the art may choose other suitable coding approaches as well. In another embodiment, the encoding process may convert either or both of the integer indicating the number of characters of the file name and the integer indicating the file size, in such a way that is also agreed upon with the user module.

After each media file is encoded, combining module 212 combines each encoded media file into a single stream of serialized data. As mentioned above, the information of each file's size included in the encoded media files enables user module 203A to separate each encoded media file from another from the single stream of serialized data that includes all media files to be processed. After combining, platform module 202A transmits the combined single stream of serialized data to user module 203A.

User module 203A receives a single stream of serialized data from platform 202A, separates encoded media files in the single stream of serialized data from each other, decodes each separated encoded media file from a predefined format to its original format, and performs a media processing operation on each of decoded media files. Before transmitting the processed media files back to platform module 202A, user module 203A may also perform encoding and combining operations on each media file, similar to those described above with respect to encoding module 210 and combining module 212 of platform module 202A.

In the embodiment shown in FIG. 2A, user module 203A includes separating module 218, decoding module 220, media operation module 222, encoding module 224, and combining module 226. After receiving from platform module 202A the combined single stream of serialized data, separating module 218 separates each encoded media file from another in the single stream of serialized data. As mentioned above, this is done with the aid of the file size information available in each encoded file. Separating module 218 scans the single stream of data, reads the file name information and identifies the file size, and locates the end of the current media file with the file size information. Separating module 218 repeats this processes for each encoded media file until all the encoded media files are separated.

Decoding module 220 converts an encoded media file from the predefined format to its original format. In the example of the image file above, SampleImageFileName1.JPEG, decoding module 220 reads the integer indicating the number of characters of the file name (which is 25), continues to read that number of bytes in the encoded media file to retrieve the array of ASCII codes representing the file name (which would be 083, 097, 109, 112, 108, 101, 073, 109, 097, 103, 101, 070, 105, 108, 101, 078, 097, 109, 101, 049, 046, 074, 080, 069, 071), and translates that array of ASCII codes to characters to extract the encoded file name (which is "SampleImageFileName1.JPEG").

Media operation module 222 processes the original media files after being decoded by decoding module 220. User module 203A may define and perform virtually any media operations in media operation module 222. Examples for media processing operation include, but not limited to, classification of images files into one or more defined groups, transformation of image orientation (rotating the image by 90 or 180 degrees), and various types of feature extraction of images. There are many existing known algorithms for each of these types of media processing operations, which one of ordinary skills in the relevant art can easily adapt to the claimed invention as needed.

As mentioned above, after processing by media operation module 222, user module 203A may perform encoding and combining operations on each media file, by its encoding module 224 and combining module 226 respectively, similar to those described above with respect to encoding module 210 and combining module 212 of platform module 202A. Then user module transmits the combined media files as another single stream of serialized data to platform module 202A.

In one embodiment, user module 203A may choose not to perform encoding and combining operations; instead, user module 203A may save the results of media operation module 222's operations, either locally or in another location. In other embodiments, user module 203A may send the results directly to an entity other than platform 202A, for example, another computing node or another user module at computing node 201A.

Separating module 214 of platform module 202A receives from combining module 226 of user module 203A the single stream of serialized data that includes media files processed by user module 203A. Similar to separating module 218 of user module 203A, separating module 214 of platform module 202A separates each encoded media file from another from the single stream of serialized data received from user module 203A. Likewise, similar to decoding module 220 of user module 203A, decoding module 216 of platform module 202A converts each encoded media file separated by separating module 214 from the predefined format to its original format. Each decoded media file which has been processed by user module 203A is then transmitted to media data storage 206 in its original format.

Figure 2B:
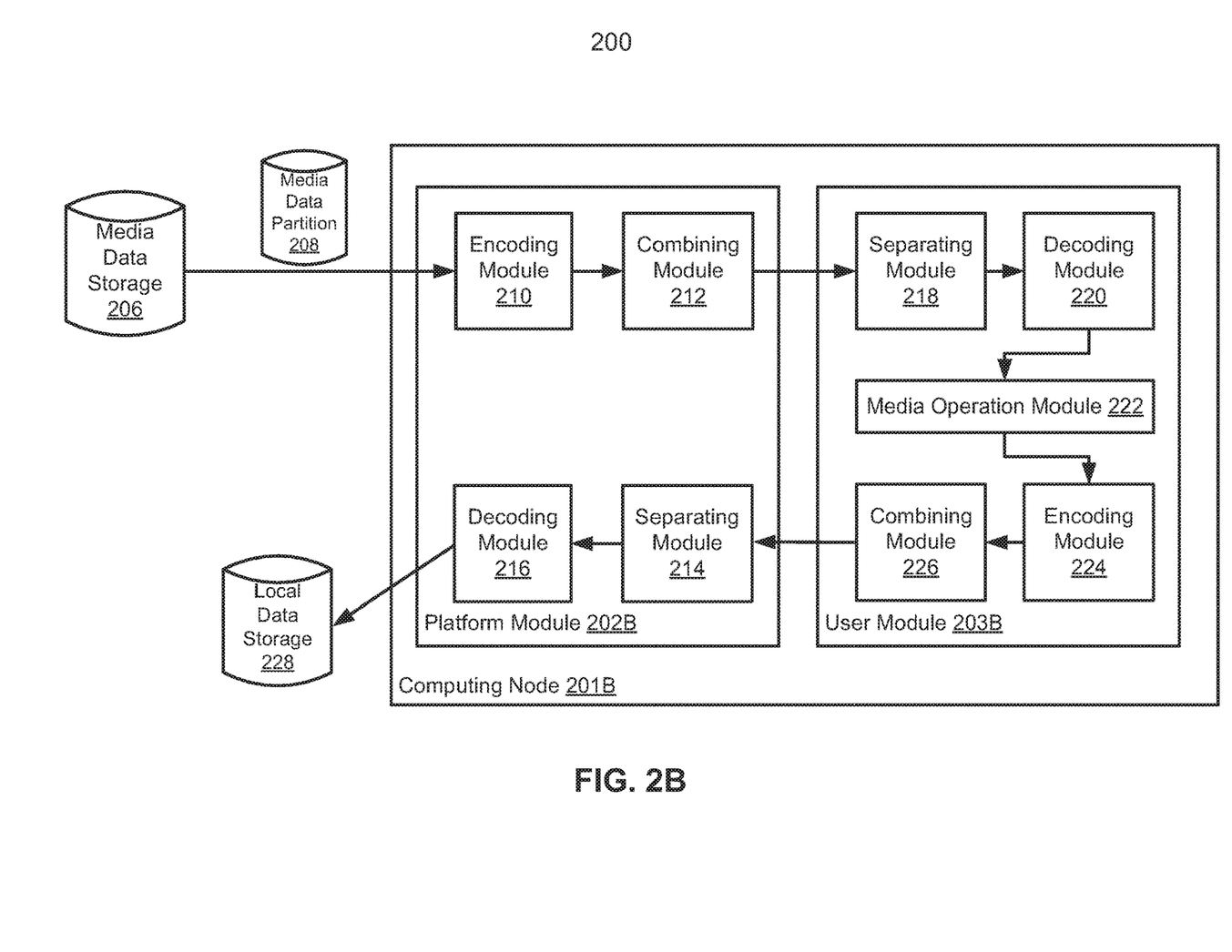

Referring to FIG. 2B, similar to FIG. 2A, computing node 201B includes platform module 202B and user module 203B. As with user module 203A, user module 203B includes separating module 218, decoding module 220, media operation module 222, encoding module 224, and combining module 226. The operations of user module 203B, and its separating module 218, decoding module 220, media operation module 222, encoding module 224, and combining module 226 are essentially same or similar with those of user module 203A and separating module 218, decoding module 220, media operation module 222, encoding module 224, and combining module 226 of user module 203A, the descriptions of which are therefore not repeated.

Platform module 202B includes encoding module 210, combining module 212, separating module 214, and decoding module 216, as with platform module 202A. In addition, platform module 202B is associated with local data storage 228. The operations of encoding module 210, combining module 212, separating module 214, and decoding module 216 of platform module 202B are essentially same or similar with those of encoding module 210, combining module 212, separating module 214, and decoding module 216 of platform module 202A, the descriptions of which are therefore not repeated.

According to the embodiment shown in FIG. 2B, after the single stream of serialized data received from user module 203B is separated (by separating module 214) and decoded (by decoding module 216), the resulting media files that have been processed by user module 203B are not transmitted back to media data storage 206; instead, they are saved into local data storage 228 associated with platform module 202B, which may not be shared with any other computing node.

Figure 2C:
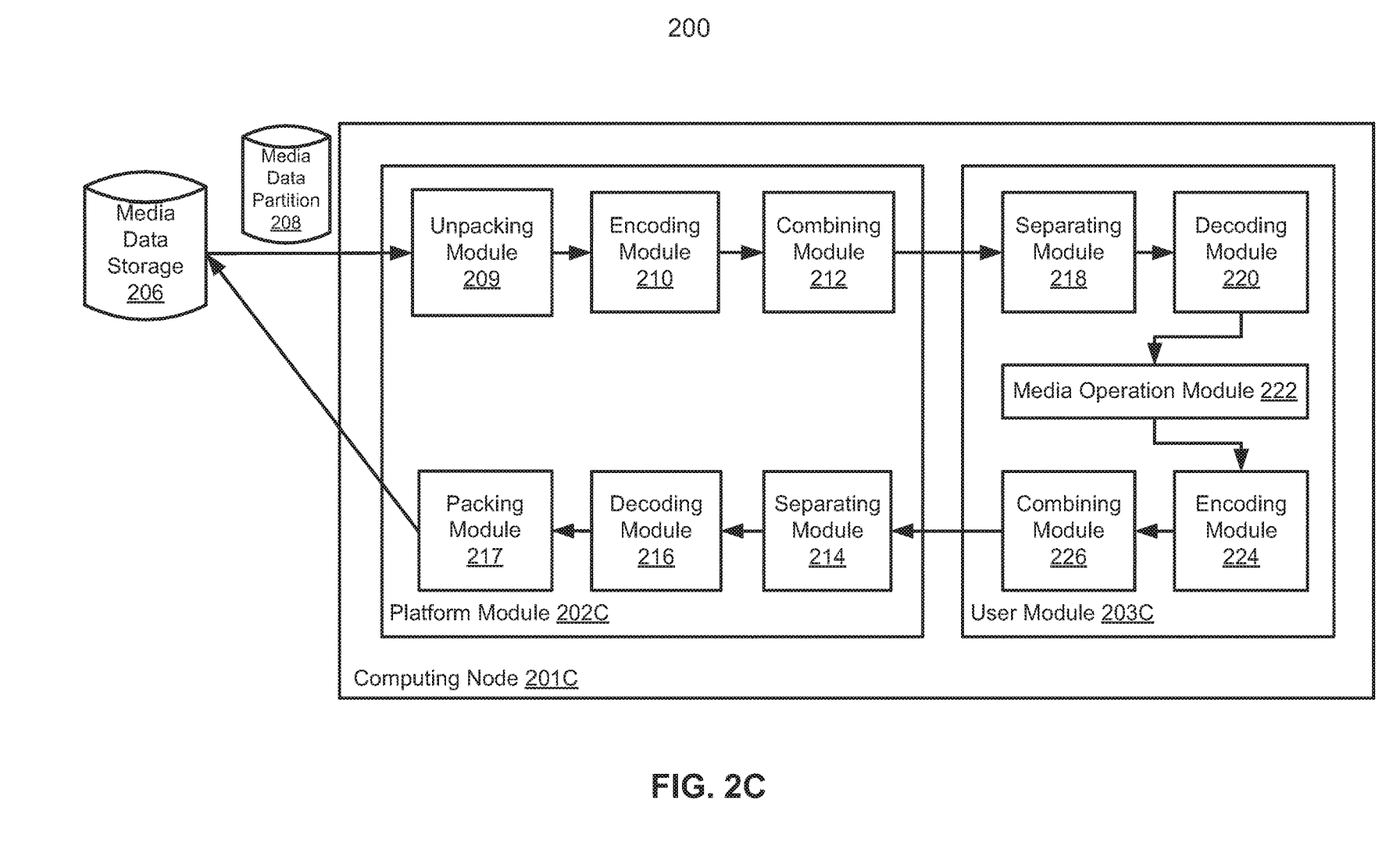

Referring to FIG. 2C, similar to FIG. 2A, computing node 201C includes platform module 202C and user module 203C. As with user module 203A, user module 203C includes separating module 218, decoding module 220, media operation module 222, encoding module 224, and combining module 226. The operations of user module 203C, and its separating module 218, decoding module 220, media operation module 222, encoding module 224, and combining module 226, are essentially same or similar with those of user module 203A and separating module 218, decoding module 220, media operation module 222, encoding module 224, and combining module 226 of user module 203A, the descriptions of which are therefore not repeated.

Platform module 202C includes encoding module 210, combining module 212, separating module 214, and decoding module 216, as with platform module 202A. In addition, platform module 202B includes unpacking module 209 and packing module 217. The operations of encoding module 210, combining module 212, separating module 214, and decoding module 216 of platform module 202C are essentially same or similar with those of encoding module 210, combining module 212, separating module 214, and decoding module 216 of platform module 202A, the descriptions of which are therefore not repeated.

According to the embodiment shown in FIG. 2C, media files within media data partition 208 are packed in one or more archives, each of which typically includes dozen, hundreds, or sometimes even thousands of the media files. Unpacking module 209, upon receiving media data partition 208 from media data storage 206, first unpacks the one or more archives and extracts the media files from those archives. Next, unpacking module 209 transmits the extracted media files to encoding module 210 for processing, as described above with respect to FIG. 2A.

Likewise, after the media files are processed by user module 203C, separated from each other by separating module 214, and decoded by decoding module 216, they are packed by packing module 217 into one or more archives before being transmitted by platform module 202C to media data storage 206.

Figure 2D:
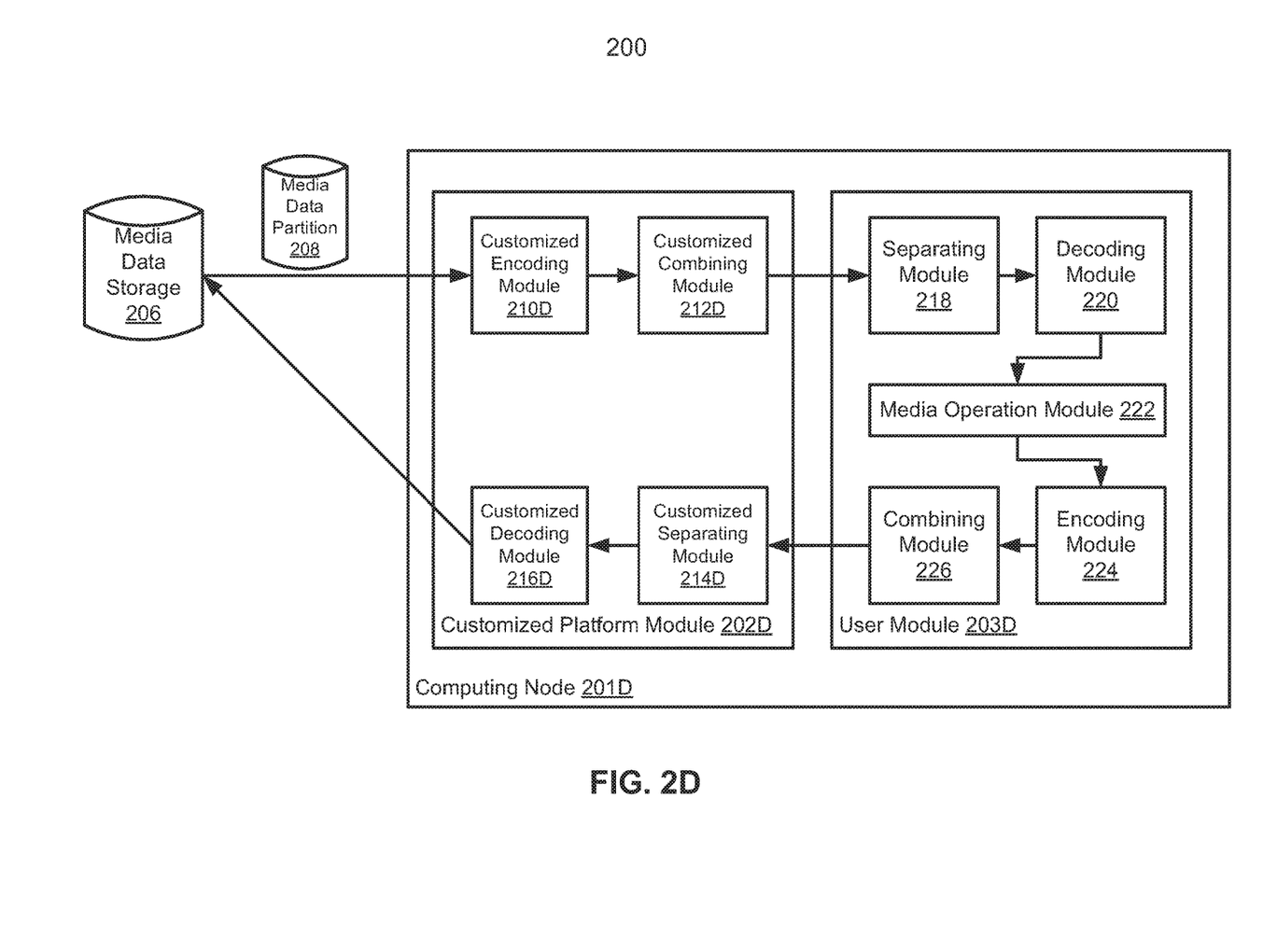

Referring to FIG. 2D, similar to FIG. 2A, computing node 201D includes customized platform module 202D and user module 203D, with the difference with computing node 201A being that computing node 201D's platform module is customized by user module 203D, as explained in more details later. As with user module 203A, user module 203D includes separating module 218, decoding module 220, media operation module 222, encoding module 224, and combining module 226. The operations of user module 203D, and its separating module 218, decoding module 220, media operation module 222, encoding module 224, and combining module 226, are essentially same or similar with those of user module 203A and separating module 218, decoding module 220, media operation module 222, encoding module 224, and combining module 226 of user module 203A, the descriptions of which are therefore not repeated.

Customized platform module 202D includes customized encoding module 210D, customized combining module 212D, customized separating module 214D, and customized decoding module 216D, similar with platform module 202A. Likewise, the operations of customized encoding module 210D, customized combining module 212D, customized separating module 214D, and customized decoding module 216D are similar with those of encoding module 210, combining module 212, separating module 214, and decoding module 216 of platform module 202A. The difference is that customized platform module 202D (and its components as listed above) is customizable by a platform user. While not absolutely necessary, this is usually done before deploying user module 203D and customized platform module 202D on computing system 100.

For example, the platform user may choose to use a different approach of encoding and/or combining, thereby requiring changes on the corresponding modules of the platform module. The embodiment shown in FIG. 2D allows the platform user to customize the encoding module, the combining module, the separating module, and/or the decoding module of the platform module. Take customized encoding module 210D as an example. In one embodiment, customized encoding module 210D is provided with a parameter that can be designated by user module 203D or can be NULL by default. The parameter can differ during runtime. User module 203D may assign to the parameter a value that is a reference to a specific function defined by user module 203D to perform the customized operations. When customized encoding module 210D receives this value, customized platform module 202D replaces the predefined default function of customized encoding module 210D with the specific function referenced by the parameter's value, and then performs the customized function defined by user module 203D. When customized encoding module 210D receives a parameter with a NULL value, it would assume that no customized operation is required by user module 203D, and will perform the predefined default encoding function.

Figure 3:
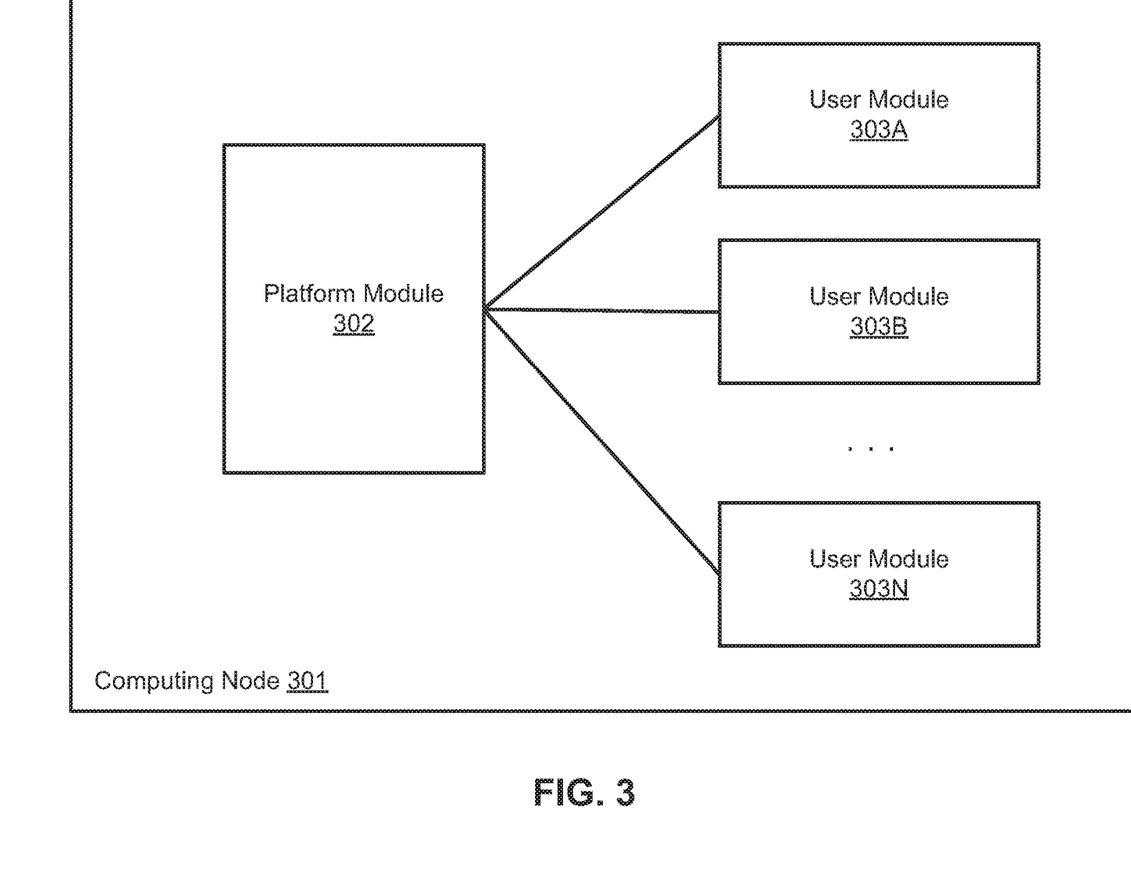
FIG. 3 is a block diagram illustrating another embodiment of a computing node according to one embodiment of the invention.

FIG. 3 is a block diagram illustrating another embodiment of a computing node according to one embodiment of the invention. As mentioned above, a computing node may have one or more user modules, each of which represents a specific user program running on a computing node and interacting with a platform module running on the same computing node. In the embodiment shown in FIG. 3, computing node 301 includes N user modules, 303A, 303B, . . . , 303N, each of which communicates with platform module 302. This may be desirable where the cluster manager 105 schedules a number of different applications running concurrently on computing nodes of computing system 100, where the applications share one platform module on a computing node but each application requires a different user module. Another scenario where this could be desirable is for some computing nodes with more processing capability than others (e.g., with more processing cores or higher network I/O throughput), such that cluster manager 105 may choose to schedule more processing tasks on those computing nodes than others. Accordingly, such computing nodes may arrange more than one user modules to process the allocated tasks. In this situation, the user modules may be essentially same or similar. It is noted that those two scenarios are for illustrative purposes only, and the applicability of FIG. 3 is by no means limited to such scenarios. One of ordinary skills in the art may adapt the embodiment illustrated by FIG. 3 to other scenarios as well. Note that each of the user programs running within a respective one of user modules 303A-303N may be carried out in one of multiple threads. Alternatively, each of the user modules 303A-303N may have its own processor or processor core and other processing resources (e.g., memory and/or storage).

Figure 4:
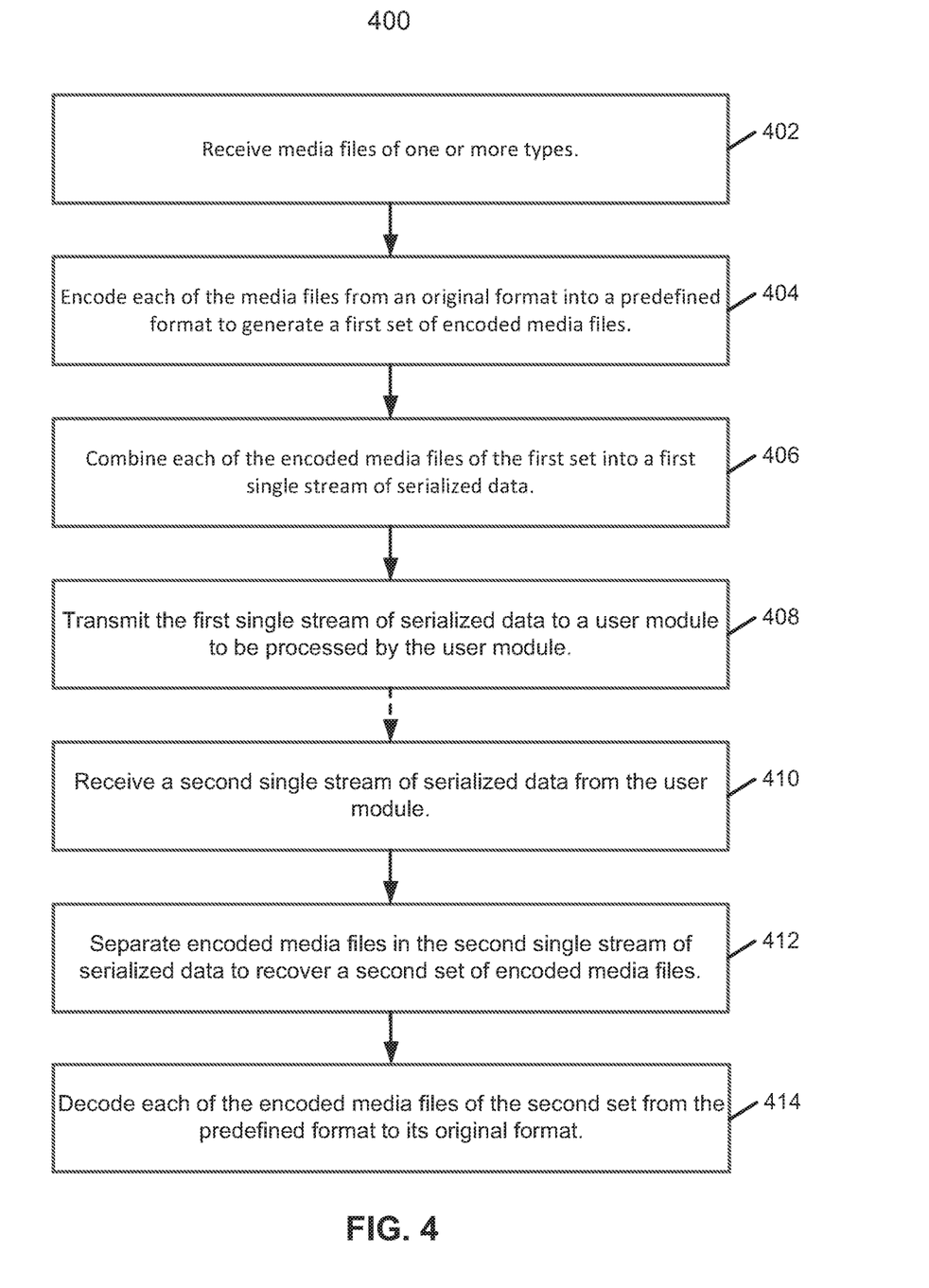
FIG. 4 is a flow diagram illustrating a process of processing media data by a platform module according to one embodiment of the invention.

FIG. 4 is a flow diagram illustrating a process of processing media data by a platform module according to one embodiment of the invention. Process 400 may be performed by processing logic that includes hardware (e.g. circuitry, dedicated logic, etc.), software (e.g., embodied on a non-transitory computer readable medium), or a combination thereof. For example, process 400 may be performed by computing node 201A of FIG. 2A.

Referring to FIG. 4, at block 402, processing logic receives media files of one or more types. The media files are included in one of multiple media data partitions partitioned by a cluster manager, which schedules each media data partition to one of a number of computing nodes for processing. The media files of one or more types may be in any of image, audio, or video file formats, including, but not limited to, JPEG, bitmap, PNG, GIF, TIFF, WAV, MP3, MPC, WMA, AAC, M4A, FLAC, Matroska, FLV, WMV, RMVB, MPEG, etc.

At block 404, processing logic encodes each of the media files from an original format into a predefined format to generate a first set of encoded media files. The predefined format and the encoding mechanism are usually agreed upon and/or supported by the platform module and a user module. At block 406, processing logic combines each of the encoded media files of the first set into a first single stream of serialized data. At block 408, processing logic transmits the first single stream of serialized data to the user module. The user module processes the first single stream of serialized data, as will be explained later.

Subsequently, at block 410, processing logic receives a second single stream of serialized data from the user module. The second single stream of serialized data includes encoded media files which have been processed and combined by the user module. At block 412, processing logic separates encoded media files in the second single stream of serialized data to recover a second set of encoded media files. At block 414, processing logic decodes each of the encoded media files of the second set from the predefined format to its original format.

In one embodiment, all processing steps in blocks 410, 412, and 414 may not be required. In one embodiment, the media files in one or more formats are received by processing logic in one or more archives, each of which includes media files. Before encoding each media file, processing logic first unpacks the one or more archives and extracts the media files from those archives. Then, each of the extracted media files is encoded and combined, as described in blocks 404 and 406. After those media files are processed by the user module and separated and decoded by processing logic, as described in blocks 412 and 414, processing logic packs them again into one or more archives. Also note that operations of blocks 402-408 and the operations of blocks 410-414 may be carried out in different threads.

Figure 5:
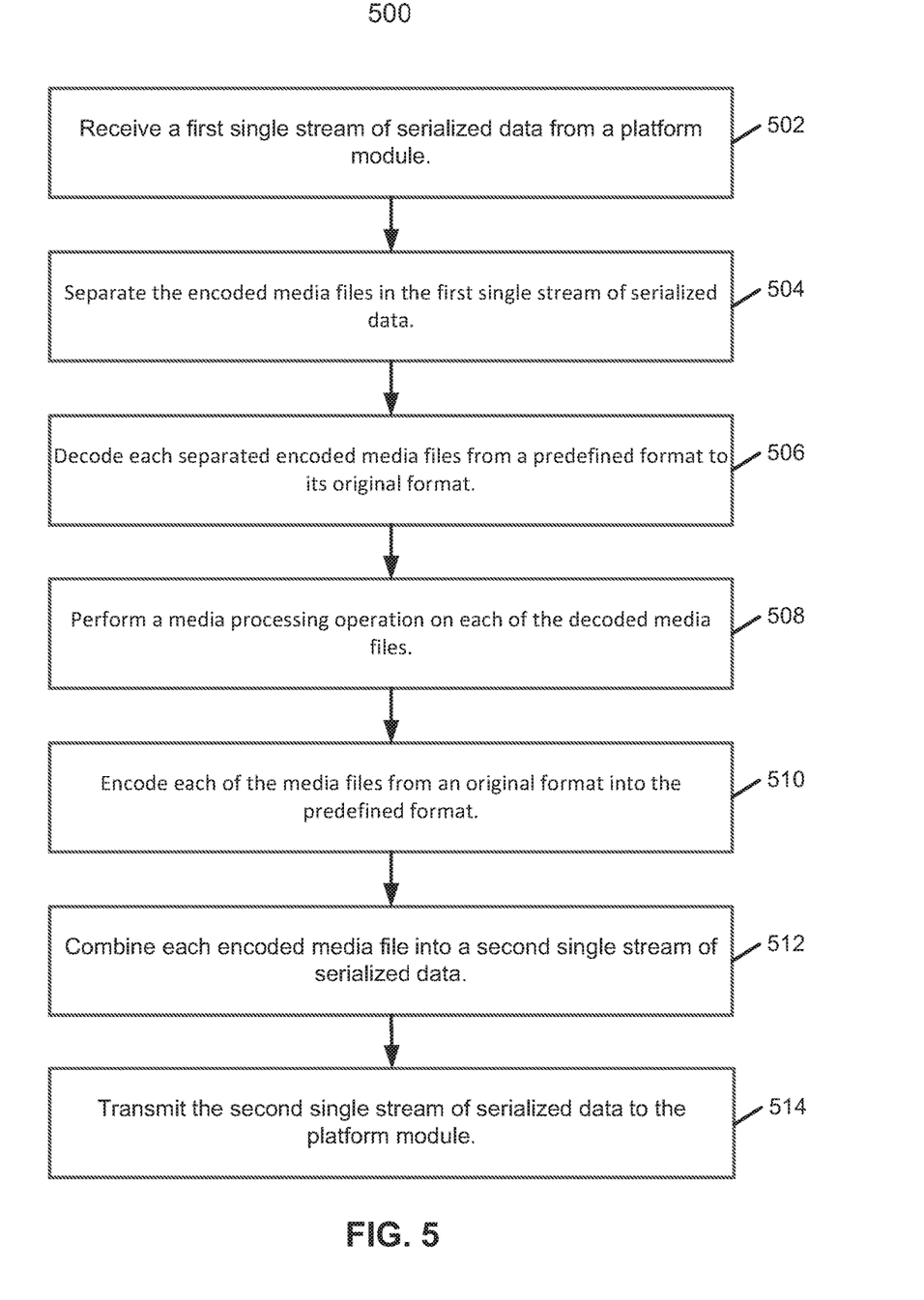
FIG. 5 is a flow diagram illustrating a process of processing media data by a user module according to one embodiment of the invention.

FIG. 5 is a flow diagram illustrating a process of processing media data by a user module according to one embodiment of the invention. Process 500 may be performed by processing logic that includes hardware (e.g. circuitry, dedicated logic, etc.), software (e.g., embodied on a non-transitory computer readable medium), or a combination thereof. For example, process 400 may be performed by computing node 201A of FIG. 2A.

Referring to FIG. 5, at block 502, processing logic receives a first single stream of serialized data from a platform module. The first single stream of serialized data includes media files in one or more formats included in a media data partition. Each media file has been encoded and combined into the single stream of serialized data by a platform module.

At block 504, processing logic separates the encoded media files in the first single stream of serialized data. At block 506, processing logic decodes each separated encoded media files from a predefined format to its original format. The predefined format and the decoding mechanism are usually agreed upon and/or supported by the user module and the platform module.

Subsequently, at block 508, processing logic performs a media processing operation on each of the decoded media files. Examples for media processing operation include, but not limited to, classification of images files into one or more defined groups, transformation of image orientation (changing the image by 90 or 180 degrees), and various types of feature extraction of images.

Subsequently, at block 510, processing logic encodes each of the media files from an original format into the predefined format. At block 512, processing logic combines each encoded media file into a second single stream of serialized data.

Subsequently, at block 514, processing logic transmits the second single stream of serialized data to the platform module. The platform module may further process the second single stream of serialized data as described above with respect to blocks 510, 512, and 514.

Note that some or all of the components as shown and described above (e.g., platform module 202A, user module 202B, etc.) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
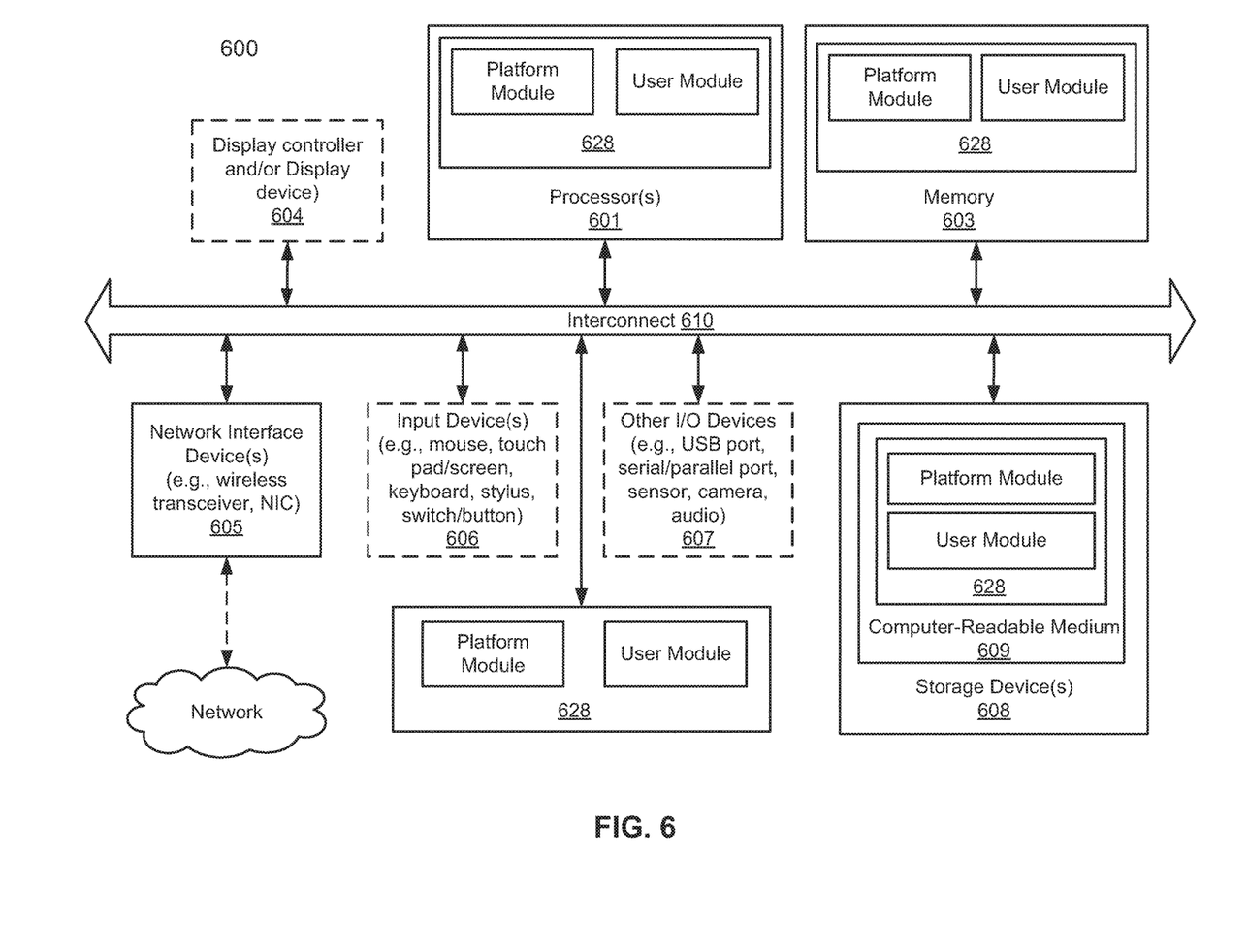
FIG. 6 is a block diagram illustrating an example system of a computing node according to one embodiment of the invention.

FIG. 6 is a block diagram illustrating an example system of a computing node which may be used with one embodiment of the invention. For example, system 600 may represents any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations and steps discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices 605-608, including network interface device(s) 605, optional input device(s) 606, and other optional IO device(s) 607. Network interface device 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with display device 604), a pointer device such as a stylus, and/or a keyboard (e.g., physical keyboard or a virtual keyboard displayed as part of a touch sensitive screen). For example, input device 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-accessible storage medium 609 (also known as a machine-readable storage medium or a computer-readable medium) on which is stored one or more sets of instructions or software (e.g., module, unit, and/or logic 628) embodying any one or more of the methodologies or functions described herein. Module/unit/logic 628 may represent any of the components described above, such as, for example, a platform module and a user module as described above. Module/unit/logic 628 may also reside, completely or at least partially, within memory 603 and/or within processor 601 during execution thereof by data processing system 600, memory 603 and processor 601 also constituting machine-accessible storage media. Module/unit/logic 628 may further be transmitted or received over a network via network interface device 605.

Computer-readable storage medium 609 may also be used to store the some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 628, components and other features described herein can be implemented as discrete hardware components or integrated in the functionality of hardware components such as ASICS, FPGAs, DSPs or similar devices. In addition, module/unit/logic 628 can be implemented as firmware or functional circuitry within hardware devices. Further, module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for processing media data, comprising:
   receiving, at a platform module of a computing node, a plurality of media files of one or more types, the plurality of media files associated with one of a plurality of media data partitions;
   encoding, at the platform module, each of the media files from its original format into a predefined format;
   combining, at the platform module, each encoded media file into a first single stream of serialized data;

separating, at a first user module of the computing node, the encoded media files in the first single stream of serialized data;

decoding, at the first user module, each separated encoded media files from the predefined format to its original format;

performing, at the first user module, a media processing operation associated with the first user module on each of the decoded media files, wherein the media processing operation associated with the first user module is modifiable and independent of the platform module and other operations of the first user module; and modifying the first user module without affecting the platform module or deploying a second user module at the computing node in addition to the first user module without affecting the platform module.

2. The method of claim 1, further comprising transmitting the first single stream of serialized data from the platform module to the first user module via a first application programming interface (API).

3. The method of claim 2, further comprising, after performing the media processing operation:

encoding, by the first user module, each of the media files from its original format into the predefined format; and
combining each encoded media file into a second single stream of serialized data.

4. The method of claim 3, further comprising transmitting the second single stream of serialized data from the first user module to the platform module via a second API.

5. The method of claim 4, further comprising:

separating, by the platform module, the encoded media files in the second single stream of serialized data; and
decoding, by the platform module, each of the encoded media files from the predefined format to its original format.

6. The method of claim 1, wherein each media data partition is processed by the platform module in a streaming-based manner.

7. The method of claim 1, further comprising unpacking the media files received by the platform module, wherein the media files are received in a packed archive.

8. The method of claim 1, wherein at least of one the encoding and combining operations performed by the platform module is subject to customization by the first user module.

9. The method of claim 1, wherein the media processing operation includes at least one of classification, image transformation, and feature extraction.

10. A non-transitory machine-readable medium having executable instructions stored therein, which when executed by a processor, cause the processor to perform operations of processing media data, the operations comprising:

receiving, at a platform module, a plurality of media files of one or more types, the plurality of media files associated with one of a plurality of media data partitions;

encoding, at the platform module, each of the media files from its original format into a predefined format;

combining, at the platform module, each encoded media file into a first single stream of serialized data;

separating, at a first user module of the computing node, the encoded media files in the first single stream of serialized data;

decoding, at the first user module, each separated encoded media files from the predefined format to its original format;

performing, at the first user module, a media processing operation associated with the first user module on each of the decoded media files, wherein the media processing operation associated with the first user module is modifiable and independent of the platform module and other operations of the first user module; and modifying the first user module without affecting the platform module or deploying a second user module at the computing node in addition to the first user module without affecting the platform module.

11. The non-transitory machine-readable medium of claim 10, wherein the operations further comprise transmitting the first single stream of serialized data from the platform module to the first user module via a first application programming interface (API).

12. The non-transitory machine-readable medium of claim 11, wherein the operations further comprise, after performing the media processing operation:

encoding, by the first user module, each of the media files from its original format into the predefined format; and
combining each encoded media file into a second single stream of serialized data.

13. The non-transitory machine-readable medium of claim 12, wherein the operations further comprise transmitting the second single stream of serialized data from the first user module to the platform module via a second API.

14. The non-transitory machine-readable medium of claim 13, wherein the operations further comprise:

separating, by the platform module, the encoded media files in the second single stream of serialized data; and
decoding, by the platform module, each of the encoded media files from the predefined format to its original format.

15. The non-transitory machine-readable medium of claim 10, wherein each media data partition is processed by the platform module in a streaming-based manner.

16. The non-transitory machine-readable medium of claim 10, wherein the operations further comprise unpacking the media files received by the platform module, wherein the media files are received in a packed archive.

17. The non-transitory machine-readable medium of claim 10, wherein at least of one the encoding and combining operations by the platform module is subject to customization by the first user module.

18. The non-transitory machine-readable medium of claim 10, wherein the media processing operation includes at least one of classification, image transformation, and feature extraction.

19. A data processing system, comprising:

a processor;
a memory coupled to the processor;
a platform module configured to:
  receive a plurality of media files of one or more types, the plurality of media files associated with one of a plurality of media data partitions;
  encode each of the media files from its original format into a predefined format; and
  combine each encoded media file into a first single stream of serialized data;
a first user module configured to:
  separate the encoded media files in the first single stream of serialized data;
  decode each separated encoded media files from the predefined format to its original format; and
  perform a media processing operation associated with the first user module on each of the decoded media files, wherein the media processing operation associated with the first user module is modifiable and independent of the platform module and other operations of the first user module; and wherein the processor is configure to modify the first user module without affecting the platform module or deploy a second user module at the data processing system in addition to the first user module without affecting the platform module.

20. The system of claim 19, wherein the platform module is further configured to transmit the first single stream of serialized data from the platform module to the first user module via a first application programming interface (API).

21. The system of claim 20, wherein the first user module is further configured to, after performing the media processing operation:

encode each of the media files from its original format into the predefined format; and combine each encoded media file into a second single stream of serialized data.

22. The system of claim 21, wherein the first user module is further configured to transmit the second single stream of serialized data from the first user module to the platform module via a second API.

23. The system of claim 22, wherein the platform module is further configured to:

separate the encoded media files in the second single stream of serialized data; and decode each of the encoded media files from the predefined format to its original format.

24. The system of claim 19, wherein each media data partition is processed by the platform module in a streaming-based manner.

25. The system of claim 19, wherein the platform module is further configured to unpack the media files received by the platform module, wherein the media files are received in a packed archive.

26. The system of claim 19, wherein at least of one the encoding and combining operations performed by the platform module is subject to customization by the first user module.

27. The system of claim 19, wherein the media processing operation includes at least one of classification, image transformation, and feature extraction.

* * * * *